Sept. 11, 1923.  1,467,305
L. J. BUOB
VEHICLE BODY
Filed Nov. 8, 1919   2 Sheets-Sheet 1

Inventor:
Louis J. Buob

By Allen & Allen
Attorneys.

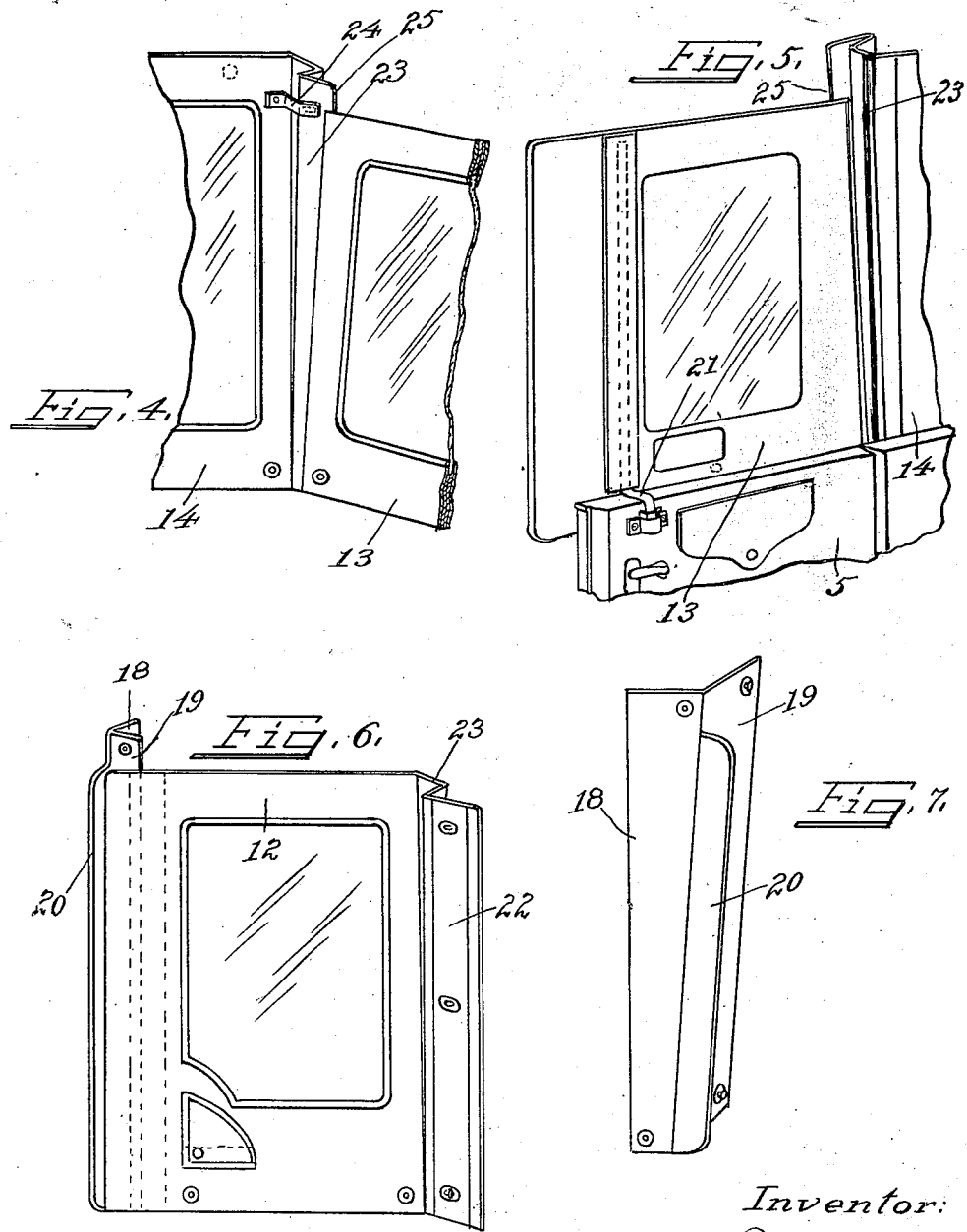

Patented Sept. 11, 1923.

1,467,305

UNITED STATES PATENT OFFICE.

LOUIS J. BUOB, OF CINCINNATI, OHIO, ASSIGNOR TO BUOB & SCHEU, A FIRM COMPOSED OF FRED D. BUOB, LOUIS J. BUOB, FRONA BUOB, AND MARIE BUOB, DOING BUSINESS AT CINCINNATI, OHIO.

VEHICLE BODY.

Application filed November 8, 1919. Serial No. 336,587.

*To all whom it may concern:*

Be it known that I, LOUIS J. BUOB, a citizen of the United States, and a resident of the city of Cincinnati, in the county of Hamilton and State of Ohio, have invented certain new and useful Improvements in Vehicle Bodies, of which the following is a full, clear, and exact description, reference being had to the drawings forming a part of this specification.

My invention relates to devices for providing enclosed body attachments for automobiles and other vehicles, but more particularly for bodies having folding tops. It is my object to provide semi-rigid assembly of parts, including doors which open freely, that may be attached at will or removed from the top of an automobile or carriage.

It is further my object by various mechanical arrangements to provide for a weather-tight closed body, same being made up of independent parts having overlapping elements, when assembled, and the parts thereof separately demountable in approximately the same manner as ordinary side curtains.

The above objects and other various improvements to be noted hereinafter I accomplish by that certain construction and arrangement of parts to be hereinafter more specifically pointed out and claimed.

In the drawings,

Figure 4 is an exterior perspective of one of the side door curtain members.

Figure 5 is an interior perspective of the same.

Figure 6 is an exterior perspective view of one of the front door arrangements.

Figure 7 is a perspective of one of the front corner pieces.

Figure 1:
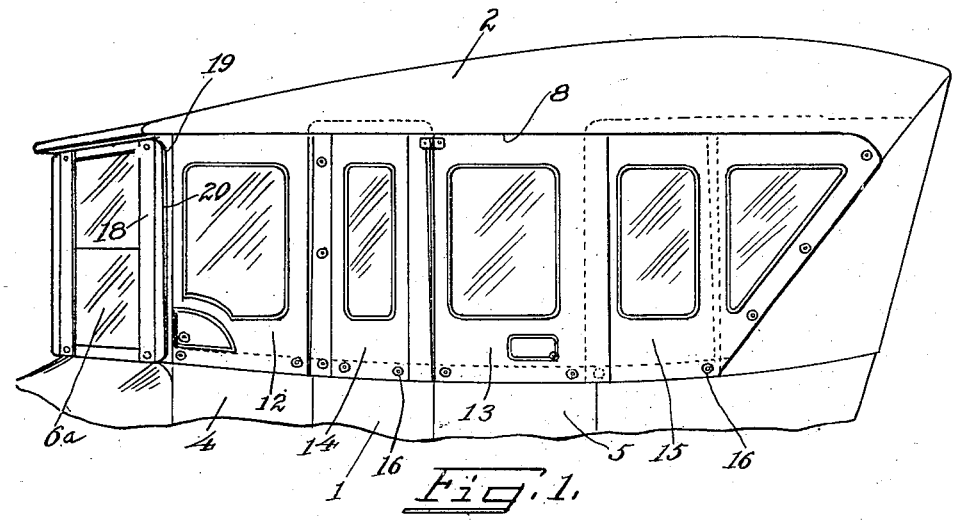
Figure 1 is a perspective view of the side of a vehicle equipped with my invention.
Figure 2:
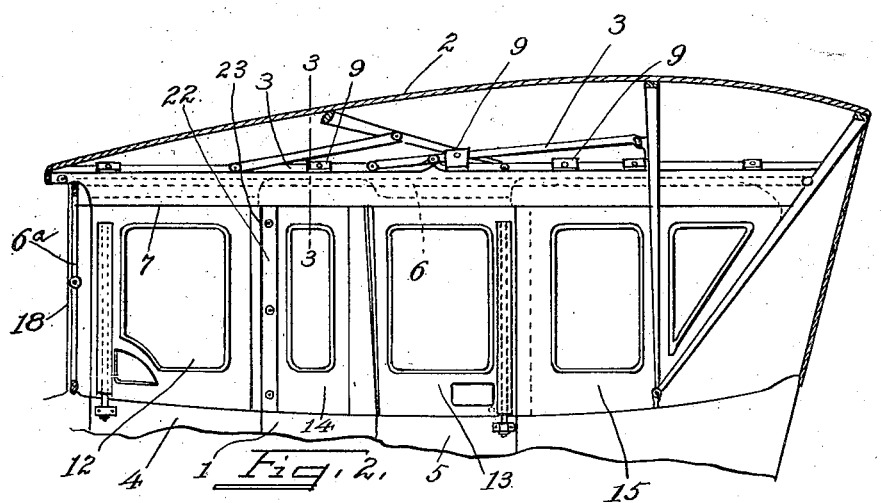
Figure 2 is an interior view of the same parts shown in Figure 1.
Figure 3:
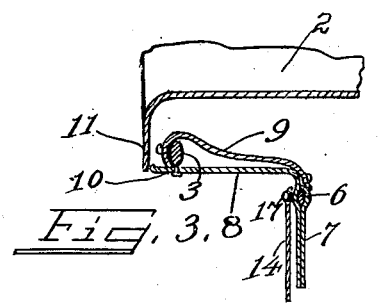
Figure 3 is a detail section shown as taken on the line 3—3 of Figure 2.

The vehicle has a body 1, a top 2, and top supporting rods or bows generally indicated as 3. The front doors are indicated as 4, and the rear doors as 5. There is also shown a glass front or windshield $6^a$ for the vehicle, and the whole of the above is a mere selection of any desired automobile body and top, and not an essential part of my invention, which is intended to be applied to any desired body and top.

It is generally the custom in design of automobiles and other vehicles to make the top thereof with a considerable overhang from the sides of the vehicle body itself, this overhang varying with design, and usually tapering off at the front and back to about the size of the vehicle body.

In order to obtain a weather-tight fit of an independent set of curtains or sides, including sides movable with the doors, same being weather-tight, I provide a member which conforms to the body of the vehicle and fills in the overhanging space between the top and the body, and moreover the means adopted should be adaptable to being removed when it is desired to fold back the top, unless a special top must be provided to go with the enclosed side pieces.

In the description that follows it should be noted that the construction of the various side pieces, will preferably be to make them stiff or semi-rigid, by the employing of material which is stiffened by card board or wood, stitched between the fabric that is employed. This, however, is not essential.

In order to provide for a flap of material against which all parts of the articulated sides can be secured or brought up against, which flap conforms to the shape of the vehicle body, I provide a metal bar 6, which is bowed to the shape of the body, and stitch this bar into a flap 7 of material which same extends with the bar for approximately the full length of the vehicle body.

As a part of the flap 7, I also provide an outwardly extending piece 8, which is provided at desired points along its length with fastening straps 9.

There will be one of these flap and bar assemblies at each side of the vehicle, and they are held in place by passing the straps around portions of the bows 3 of the top, and providing the pieces 8 with snap fasteners 10 mounted on the bows, said pieces extending out to the depending edges 11 of the top.

The pieces 7 will also be provided with suitable snap fasteners to be secured to some convenient portion of the vehicle top at the rear, and at the front, where it conforms to the shape of the body.

It is thus apparent that the above parts when mounted and in place will present a depending flange as an abutment for all of the removable side pieces including door curtains and also a semi-rigid upper support for such pieces as it is desired to snap to the portion filled by the metal bar.

In the particular arrangement shown there are two doors, although in a "roadster" body, or two seated vehicle this would not be the case. Thus there are a pair of front door curtains or side pieces 12, and also provision made for rear door curtains or sections 13. There are also a pair of fixed front side pieces 14, and rear fixed pieces 15.

The fixed pieces are held in place by snapping them to the sides of the vehicle body by snap fasteners 16 and to the flap 7 by snap fasteners 17, which it will be noted work directly against the metal bar re-enforcement.

At the front of the vehicle, are angle pieces, made of the same material as the sides, which have a flap 18 for attachment at the front of the vehicle, (ordinarily the wind shield) and a flap 19 which extends rearwardly, so as to form an abutment for the front door piece. They also have outwardly extending flaps 20, which form a wind guard to further secure the weather tightness of the free edge of the front door curtain when it is closed.

I have shown the front door curtains, as separate articulated parts of the device, and the rear doors as made in one piece with the fixed side pieces 14. This is merely preferential, since it will probably not be desired to remove any but the front door pieces when the closed body effect is desired.

As so constructed the door pieces, 12, are held in place on the front doors 4 by means of snap fasteners to the door structure and to one or more of the usual door irons 21. Formed with a line of fold, by means of stitching, at the rear side of the front door curtains, are securing flaps 22, which are mounted by means of snap fasteners to the fixed side pieces 14.

It is to be observed that, in many vehicles, particularly automobiles, the hinges of the doors are arranged so that the doors tilt downwardly as they open due to special hinges. When this is the case I provide for a tapering bellows fold 23 in the securing flaps 22, formed by suitable folds made in the material in whatever manner is desired, the folds being such as are formed in folding fabric fans of general use.

This construction enables the curtains to remain in place on the doors, and permits them to swing outwardly and downwardly without leaving any gap, or tearing at the fastening devices. The front door will also be provided with a weather tight abutment, in the flap 7, which hangs down below the upper line of the door curtain.

The side pieces 14, secured as above noted to the flaps 7 and the sides of the body, are made in one with the rear door curtain sections, there being formed, as in the case of the front door, a fan shaped bellows fold 23, at the hinge line between the door section and the balance of the piece. In addition to the fold I preferably secure a rubber tape 24 across the top thereof to insure the proper folding up of the bellows, and strengthen the parts by way of re-enforcement.

Due to the fact that the door pieces do not come as high on the flaps 7 as the fixed pieces, the material of the side pieces 14 is cut down at 25 to the size of the door sections 13. The door sections are secured in place by means of snap fasteners on the door, and one or more irons 21, as in the case of the front doors. They are made wide enough to extend beyond the edges of the doors so that they lap over the rear fixed pieces, on the outside thereof, just as at the top they lap the depending strips 7.

The rear fixed pieces are held in place by snapping to the re-enforced portion of the member 7 on the outer side thereof and to the car body as in the instance of the front fixed pieces.

While describing a particular installation of my device on a particular automobile body and top, as above, I do this not to define the limits of my invention, but to explain one use thereof so as to enable others to understand the application thereof, to their particular problems.

Thus doors of vehicle bodies open in different directions, the relative sizes of the various parts are not uniform, and it may require obvious modifications of the parts above described to adapt them to different situations.

Having thus described my invention, what I claim as new and desire to secure by Letters Patent is:—

1. In a device of the character described the combination with a vehicle body, top, and side curtains, of a door curtain secured to the door and at one side to the side curtains, and a bellows fold of material between the said door curtain to which it is secured to allow for a sloping hinge of the door, said bellows fold being tapered so as to allow the greatest extension of material at the upper end thereof.

2. In a device of the character described, the combination with a front door curtain secured to and adapted to swing with the door away from the front of the car of a member secured at the front to the forward end of the machine and having a flap at substantially a right angle to the front portion, to lie inside of the door curtain when the door is closed, said member having in addition an outwardly extending member to form a wind guard at the line of juncture of the front of the door curtain with said flap.

LOUIS J. BUOB.